Patented Jan. 13, 1925.

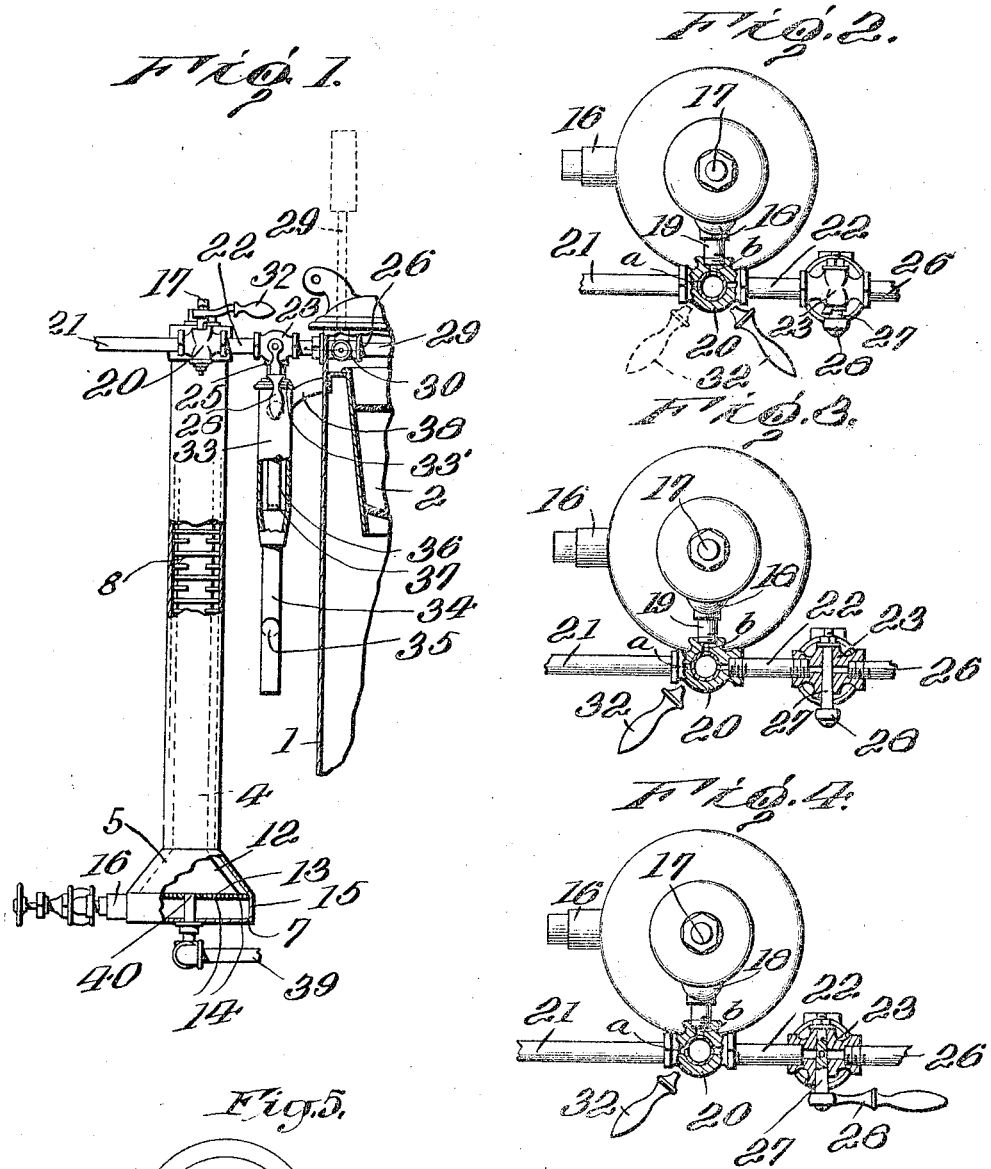

1,522,827

UNITED STATES PATENT OFFICE.

ALPHONSE F. MONEUSE, OF NEW ROCHELLE, NEW YORK.

RETARDER AND SEPARATOR FOR WATER HEATERS AND THE LIKE.

Application filed January 20, 1920. Serial No. 352,896.

*To all whom it may concern:*

Be it known that I, ALPHONSE F. MO-NEUSE, a citizen of the United States, residing at New Rochelle, in the county of Westchester and State of New York, have invented certain new and useful Improvements in Retarders and Separators for Water Heaters and the like, of which the following is a specification.

This invention relates to separators for water heaters and the like.

The general object of the invention is to provide a very simple and effective appliance for drawing hot water from the heating source of a water heater or like apparatus, such as a coffee urn, and at the same time preventing the discharge of live steam, or the too violent discharge of the hot water, due to the presence of steam, when the water faucet is turned on. For convenience, the appliance for preventing forcible discharge of steam or water mingled with steam, is called a retarder and separator.

My application Serial Number 262,184, filed November 12, 1918, shows the present retarder and separator in combination with a water heater and coffee urn.

The accompanying drawing shows a retarder and separator embodying the present invention combined with a water heater, and also shows a fragment of a coffee urn in order to show one useful adaptation of the retarder and separator.

Figure 1 is a view mainly in side elevation, but with certain parts broken away, showing the water heater, a fragment of a coffee urn, and the retarder and separator properly arranged between them.

Figure 2 is a top plan view, and

Figures 3 and 4 are similar views showing different positions of the valves, parts of the valve structures being shown in section in each view.

Figure 5 is a view of a certain cap shown at 33′ in Fig. 1 showing a steam discharge vent therein.

The casing 4 contains a heating compartment or chamber 12 which may be supplied with live steam from any suitable source, through a connection at 17. Steam may be passed off through pipe 39. Instead of steam, the heating chamber may be supplied with an electrical coil. Water is supplied from a main, through pipe 16, to the space between heating chamber 12 and the outer pocket 5 of the heater and passes upward in a circuitous path guided by the ribs or baffles 8, to the top of the heating space, from which it may be drawn through pipe 19, in different directions in accordance with the position of valve 20. A pipe 22 leads from the valve 20 toward the coffee urn 1. Between the urn and valve 20 is inserted another valve 23, and from this a short connection 25 leads to the retarder and separator designated as a whole by the numeral 2.

The retarder and separator comprises a casing 33 enclosing pipe 36 which extends from connection 25. The top of the casing is closed by a cap 33′ provided with a steam vent 31′. The bottom of pipe 36 is plugged or otherwise closed and near the end, the pipe is provided with an annular series of perforations 37. The lower end of the casing 33 may be inwardly tapered as shown. Discharge pipe 34 leads from the bottom of the casing and this pipe may have a suitable bend 35 to bring the end of the pipe out to a convenient position for discharging hot water into different receptacles.

The valve 20 has two operative positions and a shut off position, and so has valve 23. The pipe 21 leads from valve 20 to another point to which it may be desired to supply water heated by the heater 4. With the valve handle 32 in the position shown in Figure 2, water is discharged from the heater to pipe 21. With the valve handle in the position shown in dotted lines in Figure 2, or in full lines in Figure 3, the heated water is directed through pipe 22. With the handle in intermediate position, discharge from the heater is prevented. The valve 23 is arranged to deliver heated water, when directed through pipe 22 by valve 20, either to retarder and separator through pipe 36, or to the coffee urn, through pipe 26. Figures 2, 3 and 4 show this valve in its different positions.

When the valves are turned so as to discharge water through the retarder and separator, the first discharge frequently consists of steam or water mixed with a considerable quantity of steam. In either case, the fluid is discharged horizontally through perforations 37 against the side of casing 2, and the velocity of the steam is absorbed and water collects so that a solid stream is discharged from the end of pipe 34 at reasonable velocity, without splashing from the receptacle placed to receive it, and without annoyance or danger to the attendant. The vent 31′ serves in this case to permit the escape of such steam as may not be condensed.

The retarder and separator may be supported in any convenient way, but usually the casing is provided with an arm 38, connected to the casing of the coffee urn.

Persons familiar with this art will readily understand from the drawings and the foregoing description, that the invention may be variously embodied, and I do not limit myself to details, except as claimed.

Having thus described my invention, what I claim is:

1. The combination with a water heater, of a retarder and separator comprising a casing, a supply pipe in the casing and connected with the water heater, said pipe terminating with a closed end above the lower end of the casing there being laterally disposed openings in the lower end of the supply pipe, means to permit escape of steam from said casing, and a discharge pipe connected to the lower end of the casing.

2. The combination with a water heater, of a retarder and separator comprising a casing, a supply pipe in the casing connected with the water heater, said pipe having a closed lower end and terminating above the lower end of the casing, there being in the lower end of the pipe annular series of laterally directed nozzles for the purpose set forth, means to permit escape of steam from said casing, and a discharge pipe connected to the lower end of the casing.

3. The combination with a water heater, of a retarder and separator comprising a casing provided with a cap having a vent, a supply pipe in the casing connected with the water heater, and terminating with a closed end above the lower end of the casing, the pipe being provided with an annular series of laterally directed nozzles, and a discharge pipe connected to the lower end of the casing.

4. The combination with a water heater, of a retarder and separator comprising a casing provided with a cap having a vent, a supply pipe in the casing connected with the water heater, and terminating with a closed end above the lower end of the casing, the pipe being provided with an annular series of laterally directed nozzles, and a discharge pipe connected to the lower end of the casing, a valve controlling the supply of water from the heater to the retarder and separator.

5. The combination with a water heater and a coffee urn, requiring heated water, of a retarder and separator, a pipe for supplying hot water from the heater to the urn, a valve controlling such supply to the urn and to another point of utilization, a retarder and separator comprising means for preventing forcible discharge of steam and for producing the discharge of a substantially solid stream of water at moderate velocity, said retarder and separator being further provided with means for permitting the escape of uncondensed and separated steam, and a valve controlling the supply of hot water to the retarder and separator or to the urn, selectively.

In testimony whereof I affix my signature in presence of two witnesses.

ALPHONSE F. MONEUSE.

Witnesses:
HERMAN VUILLE,
WM. F. RAFFERTY.